United States Patent
Alber

(10) Patent No.: US 6,427,546 B2
(45) Date of Patent: Aug. 6, 2002

(54) LINEAR GUIDE UNIT

(75) Inventor: Eberhard Alber, Bad Liebenzell (DE)

(73) Assignee: Ina Walzlager Schaeffler oHG (DE)

( * ) Notice: Subject to any disclaimer, the term of this patent is extended or adjusted under 35 U.S.C. 154(b) by 4 days.

(21) Appl. No.: 09/729,840

(22) Filed: Dec. 4, 2000

(30) Foreign Application Priority Data

Dec. 17, 1999 (DE) ......................... 199 60 940

(51) Int. Cl.$^7$ .................. F16H 19/04; F16H 19/06; F16H 21/04
(52) U.S. Cl. ................. 74/89.17; 74/89.22; 384/15; 384/42
(58) Field of Search ................ 74/89, 89.17, 89.2, 74/89.21, 89.22, 422; 384/42, 15

(56) References Cited

U.S. PATENT DOCUMENTS

| | | | |
|---|---|---|---|
| 3,446,539 A | * | 5/1969 | Sartorio ........................ 384/15 |
| 4,541,293 A | | 9/1985 | Caugant et al. |
| 5,460,059 A | * | 10/1995 | Kato ........................... 108/143 |

FOREIGN PATENT DOCUMENTS

| | | |
|---|---|---|
| DE | 7131135 | 11/1971 |
| DE | 8909120 | 10/1989 |
| DE | 19532759 | 3/1997 |
| DE | 19758346 | 7/1998 |
| EP | 0340751 | 8/1996 |
| GB | 2095141 | 9/1982 |

* cited by examiner

Primary Examiner—Allan D. Herrmann
(74) Attorney, Agent, or Firm—Bierman, Muserlian and Lucas

(57) ABSTRACT

In a linear guide unit comprising a guide housing configured as a profiled girder having a bottom wall and a side wall, said bottom and side walls defining empty guide space and forming an angle of less than 180° with each other in cross-section, a guide rail fixed on one of the bottom wall and the side wall, said guide rail being partially surrounded by at least one sliding traveler supported thereon, and a carriage plate fixed on the traveler and projecting out of a longitudinal opening of the empty guide space, said carriage plate having a connecting surface for connection to a connecting structure that is to be moved in a longitudinal direction of the guide housing, for a further delimitation of the empty guide space, a cover sheet is detachably fixed on the side wall in an end region of the side wall opposing the bottom wall, the longitudinal opening for the carriage plate being arranged between a free end region of the cover sheet and the bottom wall. The traveler comprises a drive having a drive shaft and a toothed pinion that is fixed on the drive shaft and meshes with a toothed rack. A movement of the traveler transmitted through a flexible traction element causes a rotation of two driven shafts.

8 Claims, 2 Drawing Sheets

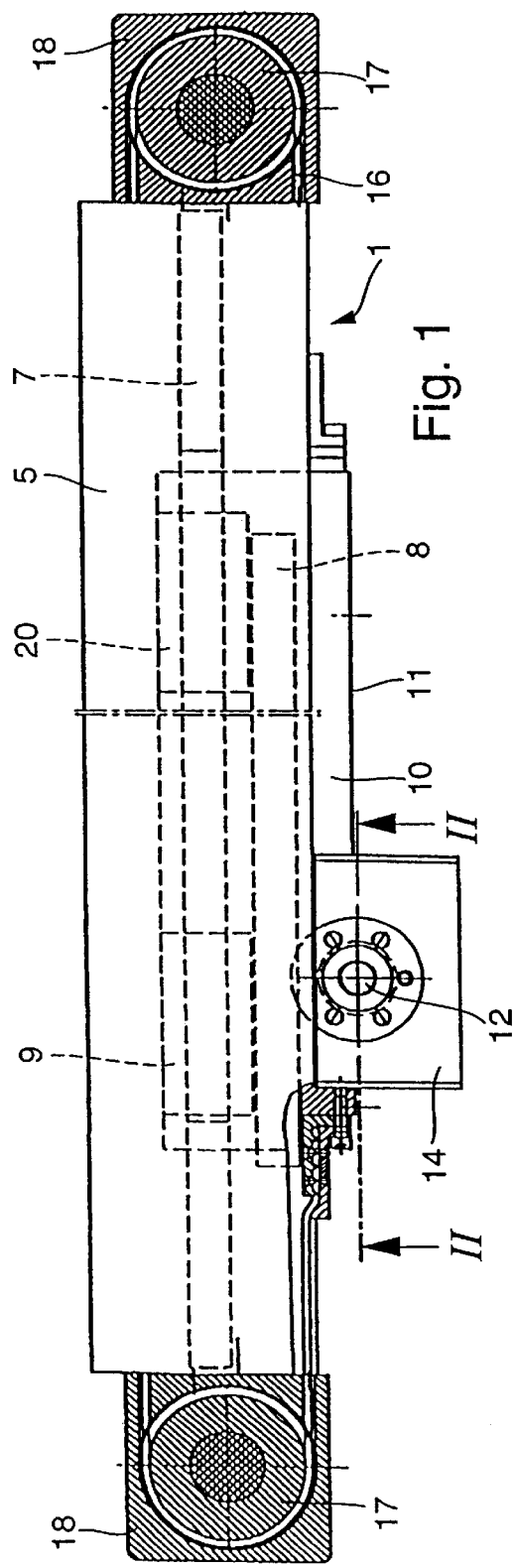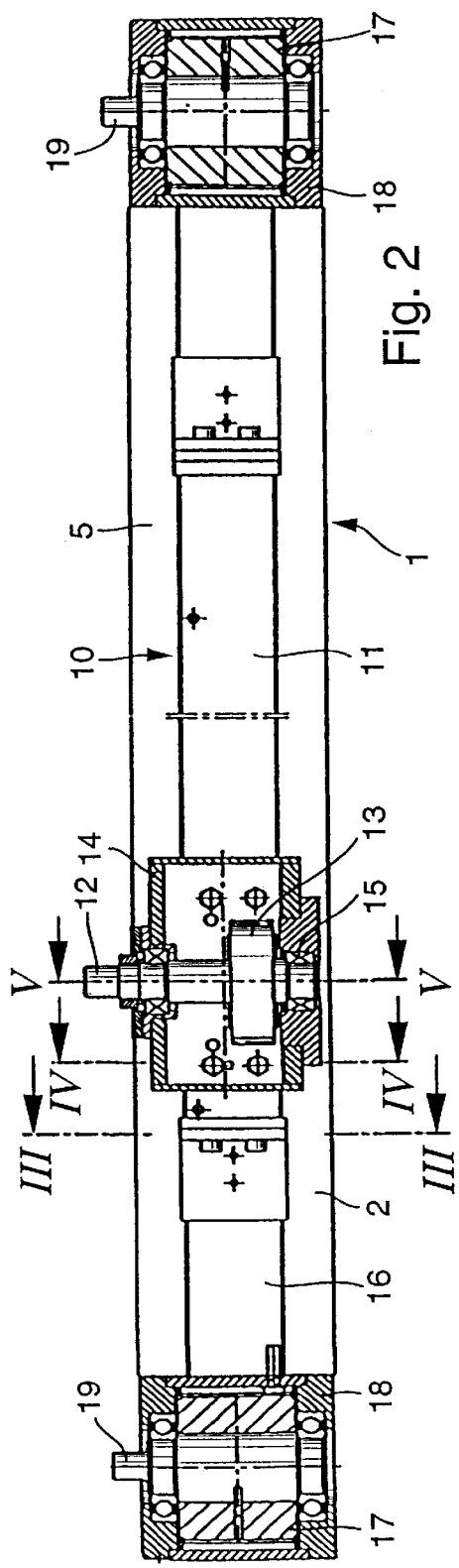

LINEAR GUIDE UNIT

FIELD OF THE INVENTION

The invention concerns a linear guide unit comprising:

a guide housing configured as a profiled girder having a bottom wall and a side wall, said bottom and side walls defining an empty guide space and forming an angle of less than 180° with each other in cross-section, a guide rail fixed on one of the bottom wall and the side wall, said guide rail being partially surrounded by at least one sliding traveler supported thereon, and a carriage plate fixed on the traveler and projecting out of an open side of the profiled girder, said carriage plate having a connecting surface for connection to a connecting structure that is to be moved in a longitudinal direction of the guide housing.

BACKGROUND OF THE INVENTION

A linear guide unit of the pre-cited type is known from EP 0 340 751 B1. The empty guide space of this linear guide unit is formed by a profiled girder from whose bottom plate two parallel side walls extend upwards and comprise on their upper ends, the longitudinal opening for a carriage plate designated as a connecting body is arranged. This arrangement therefore renders access to the guide rail and to the traveler, which slides thereon in the closed empty guide space, difficult, and is a drawback during maintenance work.

OBJECTS OF THE INVENTION

It is an object of the invention to provide a linear guide unit which is easy to service and in which the guide rail and the traveler can be laid bare in a simple manner for maintenance work.

This and other objects and advantages of the invention will become obvious from the following detailed description.

SUMMARY OF THE INVENTION

The invention achieves the above objects by the fact that, for a further delimitation of the empty guide space, a cover sheet is detachably fixed on the side wall in an end region thereof opposing the bottom wall, the longitudinal opening for the carriage plate being arranged between a free end region of the cover sheet and the bottom wall. The use of the cover sheet results in an effective closing of the empty guide space from the exterior. The cover sheet can be easily dismounted at all times so that the interior of the guide housing and the guide rail arranged therein, as also the other parts of the linear bearing, can be inspected and serviced without the entire linear guide unit having to be disassembled.

The bottom wall and the side wall of the profiled girder may form an angle of 90° with each other in cross-section. The profiled girder may be an extrusion molded aluminum profile or may be made of steel or plastic. The guide rail may be fixed on the bottom wall or on the side wall.

A toothed rack parallel to the guide rail may be fixed on the guide housing in the empty guide space, with which toothed rack, a toothed pinion comprising a drive shaft meshes, said toothed pinion being rotatably mounted on the traveler assembly formed by the traveler and the carriage plate. The toothed pinion and the drive shaft may be rotatably mounted in a pedestal fixed on the carriage plate. A flexible traction element guided by a deflector roller that is mounted on each longitudinal end of the guide housing may act on the carriage plate, the deflector roller being rigidly connected to a coaxial driven shaft. The mounting of the deflector roller can be effected in a deflector housing.

The traveler may be mounted on the guide rail either for sliding motion or through rolling elements. The toothed rack may be fixed on the same wall (bottom wall or side wall) as the guide rail, and the guide rail and the toothed rack may also form an assembly. However, it is also possible to fix only the toothed rack on one of the two walls and only the guide rail on the other wall. Thus, the traveler can be moved along the guide rail with the help of the toothed rack and the drive shaft comprising the toothed pinion. For this, a flexible traction element is not required.

The guide rail and/or the toothed rack can be mounted in a groove or in contact with a stop edge of the profiled girder and be secured against lifting-off by suitable fastening means such as screws and/or positive engagement, force-locking or gluing. The toothed rack can be mounted in a similar manner.

It is also possible to fix two travelers on the carriage plate that partially surround the guide rail while being arranged thereon behind each other in longitudinal direction. The two travelers can also be arranged spaced from each other on the carriage plate. By the use of a second traveler, a higher capability of transmission of occurring forces and moments is obtained in the linear guide unit.

Rolling bearings are particularly suitable for mounting the toothed pinion and the drive shaft in the pedestal, but it is also possible to use sliding bearings for this purpose.

The use of a flexible traction element makes it possible to drive a driven shaft synchronously to the linear motion of the carriage plate. The flexible traction element which serves to drive the driven shaft can also form a part of the cover of the guide housing and close the longitudinal opening thereof at a location where the pedestal is not situated. A belt, a toothed belt or a strap, for example, can be used as a flexible traction element. This is firmly connected to the carriage plate of the traveler assembly and guided by a deflector roller in the region of each end of the guide housing.

The guide rail can be fixed with screws on the guide housing configured as a profiled girder. The exact fixing location of the flexible traction element may be adjustable in the longitudinal direction of the guide housing so that the pre-stress acting on the flexible traction element can be adjusted. If the flexible traction element forms a part of the cover and contributes to closing and sealing the longitudinal opening of the guide housing, an escape of lubricant from the guide house is also prevented. The flexible traction element is used as a part of the cover of the guide housing even if no driven shaft is provided in the linear guide unit.

The invention will now be described more closely with reference to the appended drawings.

BRIEF DESCRIPTION OF THE DRAWINGS

FIG. 1 is a top view of a linear guide unit of the invention, partially in section;

FIG. 2 is a side view of the linear guide unit of the invention, partially in section;

DETAILED DESCRIPTION OF THE DRAWINGS

Figure 3:
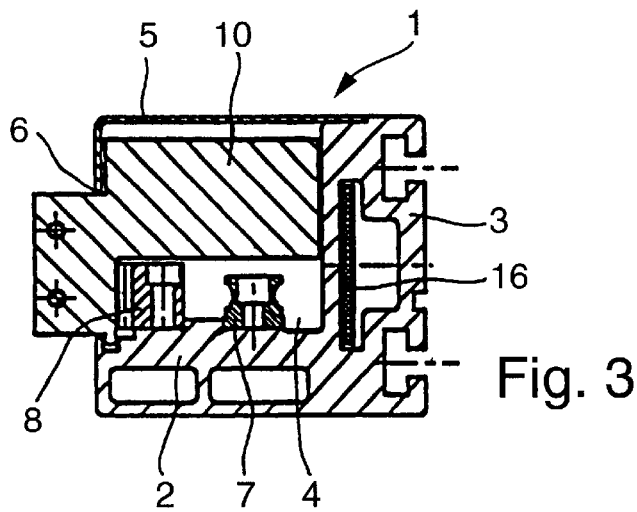
FIG. 3 shows a cross-section of the linear guide unit of the invention taken along line III—III of FIG. 2.

The linear guide unit of the invention comprises a guide housing 1 which is configured as an oblong profiled body having a bottom wall and a side wall 3. The bottom wall 2 and the side wall 3 form a right angle so that they define an empty guide space 4. This empty guide space 4 is closed by an angular cover sheet 5 which adjoins the upper end of the side wall 3 and is detachably fixed thereon.

Figure 4:
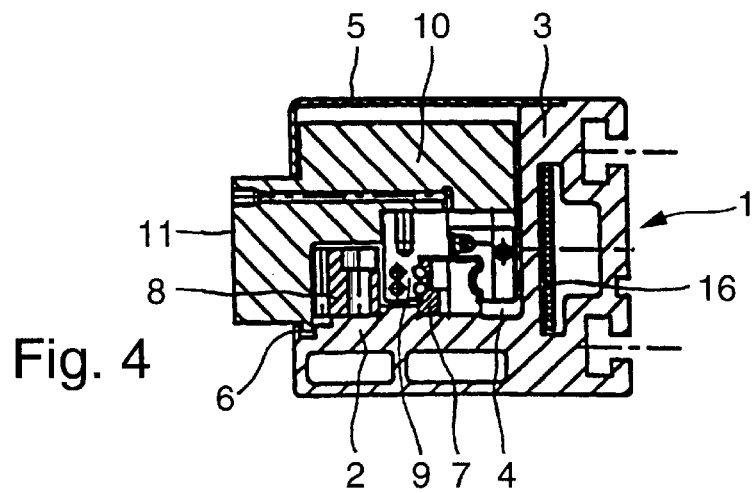
FIG. 4 shows a cross-section of the linear guide unit of the invention taken along line IV—IV of FIG. 2.
Figure 5:
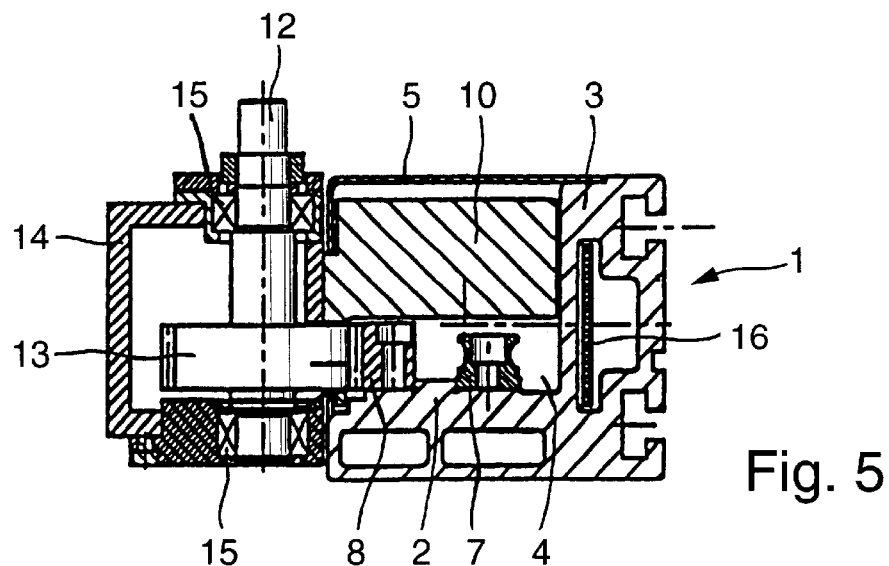
FIG. 5 shows a cross-section of the linear guide unit of the invention taken along line V—V of FIG. 2.

A longitudinal opening 6 is arranged between the end of the bottom wall 2 opposing the side wall 3 and the free end of the cover sheet 5. A guide rail 7 is mounted in the empty guide space 4 and extends parallel to the side wall 3 in the longitudinal direction of the guide housing 1. The guide rail 7 is fixed with screws on the bottom wall 2. Besides this, a toothed rack 8 parallel to the guide rail 7 is also fixed with screws on the bottom wall 2 within the guide space 4. A traveler 9, roughly indicated in FIG. 1 and discernible in FIG. 4, but not shown in FIGS. 3 and 5, partially surrounds the guide rail 7 and is supported thereon through rolling elements so that it can be displaced along the guide rail 7. The rolling elements are arranged in the traveler in a plurality of closed circuits. The traveler 9 supports a carriage plate 10 that protrudes outwards through the longitudinal opening 6 of the empty guide space 4 and comprises on its protruding end, a connecting surface 11. A connecting structure that is to be moved along the guide rail 7 can be mounted on this connecting surface 11. It can then be moved by the traveler assembly which is made up of the traveler 9 and the carriage plate 10.

To effect this movement, the traveler assembly comprises a drive having a drive shaft 12 and a toothed pinion 13 fixed thereon. The toothed pinion 13 meshes with the toothed rack 8. The drive shaft 12 with the toothed pinion 13 is rotatably mounted in a pedestal 14 through two pinion bearings 15 configured as rolling bearings. The pedestal 14 is arranged adjacent a longer side of the bottom wall 2 and of the cover sheet 5 of the guide housing 1, at a slight distance from the guide housing 1, and is fixed on the carriage plate 10. A transmission of a drive moment to the drive shaft 12 causes a rotation of the toothed pinion 13 within the pedestal 14 and thus also a movement of the pedestal 14 along the toothed rack 8 with which the toothed pinion 13 meshes. Due to the movement of the pedestal 14, the carriage plate 10 and the attached traveler 9, that are guided on the guide rail 7, are also moved.

The linear guide unit further comprises a flexible traction element 16 which may be, for example, a strap, a belt, a toothed belt or a chain. The two ends of this flexible traction element 16 are fixed on the carriage plate 10 and guided around two deflector rollers 17 which are rotatably mounted on the two longitudinal ends of the guide housing 1 in deflector housings 18. Each deflector roller 17 is arranged coaxially to a driven shaft 19 and fixed thereon. Thus, a movement of the traveler assembly and the pedestal 14 also causes a rotation of the two driven shafts 19 through the flexible traction element 16.

As can be seen in FIG. 1, the linear guide unit comprises two travelers which are arranged spaced behind one another on the guide rail 7. In addition to the traveler 9 arranged near the pedestal 14, a further traveler 20 is arranged on the guide rail 7 at a distance from the pedestal 14.

What is claimed is:

1. A linear guide unit comprising:
   a guide housing configured as a profiled girder having a bottom wall and a side wall, said bottom and side walls defining an empty guide space and forming an angle of less than 180° with each other in cross-section,
   a guide rail fixed on one of the bottom wall and the side wall, said guide rail being partially surrounded by at least one sliding traveler supported thereon, and
   a carriage plate fixed on the traveler and projecting out of a longitudinal opening of the empty guide space, said carriage plate having a connecting surface for connection to a connecting structure that is to be moved in a longitudinal direction of the guide housing,
   wherein:
   for a further delimitation of the empty guide space, a cover sheet is detachably fixed on the side wall in an end region of the side wall opposing the bottom wall, the longitudinal opening for the carriage plate being arranged between a free end region of the cover sheet and the bottom wall.

2. A guide unit of claim 1 wherein the bottom wall and the side wall of the profiled girder form an angle of 90° with each other in cross-section.

3. A guide unit of claim 1 wherein the guide rail is fixed on the bottom wall.

4. A guide unit of claim 1 wherein two travelers are fixed on the carriage plate, said travelers partially surrounding the guide rail while being arranged behind each other in longitudinal direction on the guide rail.

5. A guide unit of claim 1 wherein a toothed rack extending parallel to the guide rail is fixed on the guide housing in the empty guide space, with which toothed rack, a toothed pinion comprising a drive shaft meshes, said toothed pinion being rotatably mounted on a traveler assembly formed by the traveler and the carriage plate.

6. A guide unit of claim 5 wherein the toothed pinion and the drive shaft are rotatably mounted in a pedestal fixed on the carriage plate.

7. A guide unit of claim 5 wherein a flexible traction element guided by a deflector roller mounted on each of two longitudinal ends of the guide housing acts on the carriage plate, one or both deflector rollers being rigidly connected to a coaxial driven shaft.

8. A guide unit of claim 7 wherein each of the deflector rollers is mounted in a deflector housing.

* * * * *